United States Patent
Morgia et al.

(10) Patent No.: US 7,857,260 B2
(45) Date of Patent: Dec. 28, 2010

(54) FUEL JETTISON SYSTEM

(75) Inventors: James J. Morgia, Trumbull, CT (US); Anthony P. Cutting, Milford, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 435 days.

(21) Appl. No.: 11/624,754

(22) Filed: Jan. 19, 2007

(65) Prior Publication Data

US 2008/0173763 A1   Jul. 24, 2008

(51) Int. Cl.
*B64D 1/00* (2006.01)

(52) U.S. Cl. ............... 244/136; 244/135 R; 244/135 C

(58) Field of Classification Search ............ 244/135 R, 244/136, 1 R, 121, 135 C; 222/372; 220/4.15, 220/560.11
See application file for complete search history.

(56) References Cited

U.S. PATENT DOCUMENTS

| | | | | | |
|---|---|---|---|---|---|
| 2,038,998 | A | * | 4/1936 | Hammond, Jr. | 244/135 R |
| 2,138,970 | A | * | 12/1938 | Jones | 244/135 R |
| 2,208,621 | A | * | 7/1940 | Ball et al. | 220/562 |
| 2,262,722 | A | * | 11/1941 | Grant, Jr. | 137/209 |
| 2,283,502 | A | * | 5/1942 | Hughes et al. | 244/135 R |
| 2,880,749 | A | * | 4/1959 | Brown | 137/899.2 |
| 2,953,156 | A | * | 9/1960 | Bryant | 137/263 |
| 3,096,054 | A | * | 7/1963 | Ciminaghi | 244/135 R |
| 3,147,941 | A | * | 9/1964 | Hawthorne | 244/135 R |
| 3,419,233 | A | * | 12/1968 | Wotton | 244/135 R |
| 3,476,140 | A | * | 11/1969 | Jusyk | 137/392 |
| 4,038,817 | A | * | 8/1977 | Snow et al. | 60/204 |
| 4,089,493 | A | * | 5/1978 | Paulson | 244/135 R |
| 4,253,626 | A | | 3/1981 | Muscatell | |
| 4,441,673 | A | | 4/1984 | Muscatell | |
| 4,591,115 | A | * | 5/1986 | DeCarlo | 244/135 C |
| 4,624,426 | A | | 11/1986 | Muscatell | |
| 4,725,022 | A | | 2/1988 | Wilform, Jr. et al. | |
| 4,804,157 | A | | 2/1989 | Muscatell | |
| 5,229,956 | A | | 7/1993 | Daniell et al. | |
| 5,746,397 | A | | 5/1998 | DeField et al. | |
| 5,776,341 | A | * | 7/1998 | Barnard et al. | 210/306 |
| 7,083,147 | B2 | | 8/2006 | Movsesian et al. | |
| 7,111,809 | B1 | | 9/2006 | Tai et al. | |

FOREIGN PATENT DOCUMENTS

KR   100682396   2/2007

OTHER PUBLICATIONS

International Search report and written opinion mailed Sep. 24, 2008 for PCT/US2008/052149.

* cited by examiner

*Primary Examiner*—Rob Swiatek
*Assistant Examiner*—Philip J Bonzell
(74) *Attorney, Agent, or Firm*—Carlson, Gaskey & Olds PC

(57) ABSTRACT

A fuel jettison system which provides pilot-initiated automatic operation to jettison fuel down to a 60 minute useable fuel remaining level while the manual operation, requiring the pilot to hold down the jettison panel switch, jettisons fuel down to a 20-minute useable fuel remaining level. The pilot can interrupt jettisoning at any time. This termination sequence operates in either automatic or manual mode. The port and starboard main fuel tanks jettison fuel independently through independent shutoff valves and associated circuit logic to thereby maintain aircraft balance.

19 Claims, 3 Drawing Sheets

FUEL JETTISON SYSTEM

BACKGROUND OF THE INVENTION

The present invention relates to an aircraft fuel jettison system, and more particularly to an aircraft fuel jettison system which independently jettisons fuel from a multiple of fuel tanks to maintain equal aircraft balance.

Aircraft often include provisions for the jettison of fuel to selectively reduce the overall weight of the aircraft. This may be necessitated in response to particular conditions.

Fuel is conventionally jettisoned by a fuel jettison system with auxiliary jettison pumps and associated piping to pump fuel from the aircraft fuel tanks to an overboard location. Such a system utilizes auxiliary pumps within each fuel tank which are not used for any other purpose and which comprise a significant load factor and installation expense.

Conventional fuel jettison systems generally rely upon existing fuel tank quantity meters to determine the quantity of fuel which has been jettisoned. This may complicate aircraft control under certain circumstances as conventional fuel jettison systems typically just jettison to a predefined useable fuel remaining level irrespective of fuel location and aircraft fuel balance.

Accordingly, it is desirable to provide a fuel jettison system which provides independent jettisoning to a multiple of useable fuel remaining levels from a multiple of fuel tanks to maintain equal balance.

SUMMARY OF THE INVENTION

The fuel jettison system according to the present invention generally includes an overboard fuel jettison conduit, a fuel pump, a fuel jettison conduit, a shutoff valve, and a dip conduit. The overboard fuel jettison conduit communicates jettisoned fuel from the fuel pump to an overboard location typically from an aft section of one of the sponsons.

The shutoff valve is located in each fuel jettison conduit within the aircraft cabin sidewall. The shutoff valve is in communication with a fuel management control system for selective operation thereby. The shutoff valve is powered open by an actuator such as a solenoid valve and is closed in response to a mechanical bias. A manual actuator such as a lever accessible from within the aircraft cabin may also be utilized to overcome the bias and open the shutoff valve. Since the shutoff valves are located in the cabin sidewalls, they are accessible to crew should a malfunction occur.

The shutoff valve includes an inward venting feature which permits the fuel jettison conduit to be vented such that the fuel pump may be operated to completely purge fuel from the fuel jettison conduit at the completion of a fuel jettison event to assure that all fuel downstream of the shutoff valve is purged from the fuel jettison system. The inward venting feature also facilitates ground support fuel pump checkout without having to actually jettison fuel which is advantageous in a shipboard environment.

In operation, the fuel jettison system provides pilot-initiated automatic operation to jettison fuel down to, for example, a sixty (60) minute useable fuel remaining level. The fuel management control system communicates with fuel level probes of an FQGS to independently operate the shutoff valve such that aircraft balance is maintained. That is, the fuel jettison control system includes control algorithms which will independently operate each shutoff valve such that when each fuel tank separately reaches the sixty (60) minute useable fuel remaining level, the fuel management control system separately shuts the shutoff valve then purges that fuel jettison conduit. Pilot-initiated automatic operation is initiated by actuation of a fuel jettison switch.

The fuel jettison system requires pilot-initiated manual operation to jettison further fuel down to a minimum, for example, twenty (20) minute useable fuel remaining level. This operation is achieved by holding the fuel jettison switch throughout the jettisoning operation to the minimum twenty (20) minute useable fuel remaining level. Since the bellmouth opening of the dip conduit is located at the minimum twenty (20) minute useable fuel remaining level, under no situation will the fuel jettison system jettison a quantity of fuel greater than this minimum twenty (20) minute useable fuel remaining level.

The present invention therefore provides a fuel jettison system which provides independent jettisoning to a multiple of useable fuel remaining levels from a multiple of fuel tanks to maintain equal balance.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
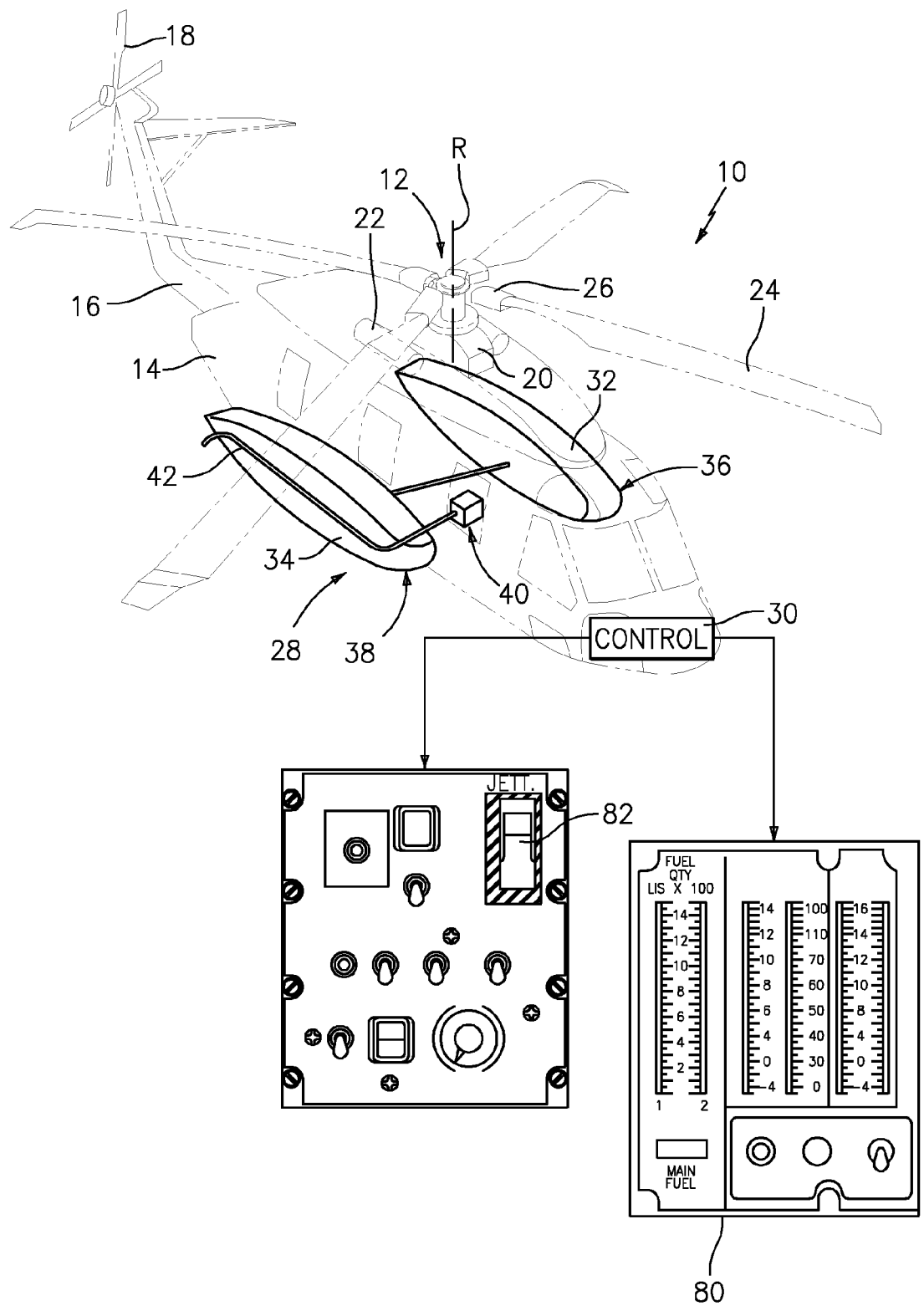
FIG. 1 is a general perspective view an exemplary rotary wing aircraft embodiment for use with the present invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation R through a main gearbox (illustrated schematically at 20) by one or more engines 22. The main rotor system 12 includes a multiple of rotor blades 24 mounted to a rotor hub 26. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

The aircraft 10 includes a fuel system 28. The fuel system 28 generally includes a fuel management control system 30, a port main fuel tank 32 and a starboard main fuel tank 34 which communicate fuel to the engines 22. As generally understood, each fuel tank 32, 34 may generally contain a pressure refuel/defuel valve, fuel quantity and low-level sensors, high-level shutoff valves, low-level shutoff valves, check valve sump drains, as well as other fuel communication components (illustrated somewhat schematically at F in FIG. 2) which need not be further described herein as such components are directed to communication of fuel to the engines 22.

The port main fuel tank 32 and the starboard main fuel tank 34 are preferably located in sponsons 36, 38 mounted to a port and starboard side of the airframe 14. Both main fuel tanks are crashworthy, self-sealing and interchangeable. It should be understood that other fuel tank arrangements will benefit from the present invention, however, the illustrated arrangement is typical of a rotary wing aircraft.

The fuel system 28 further includes a fuel jettison system 40 (FIG. 2) to selectively jettison fuel from the main fuel tanks 32, 34 to a safe overboard location in response to the fuel management control system 30. It should be understood that the fuel jettison system 40 is preferably independent of a fuel communication path from the main fuel tanks 32, 34 to the engines 22 to minimize unintentional fuel loss. Although only the fuel jettison system 40 from the single port main fuel tank 32 will be described in detail herein, each fuel tank within the fuel system 28 will include similar components.

Figure 3:
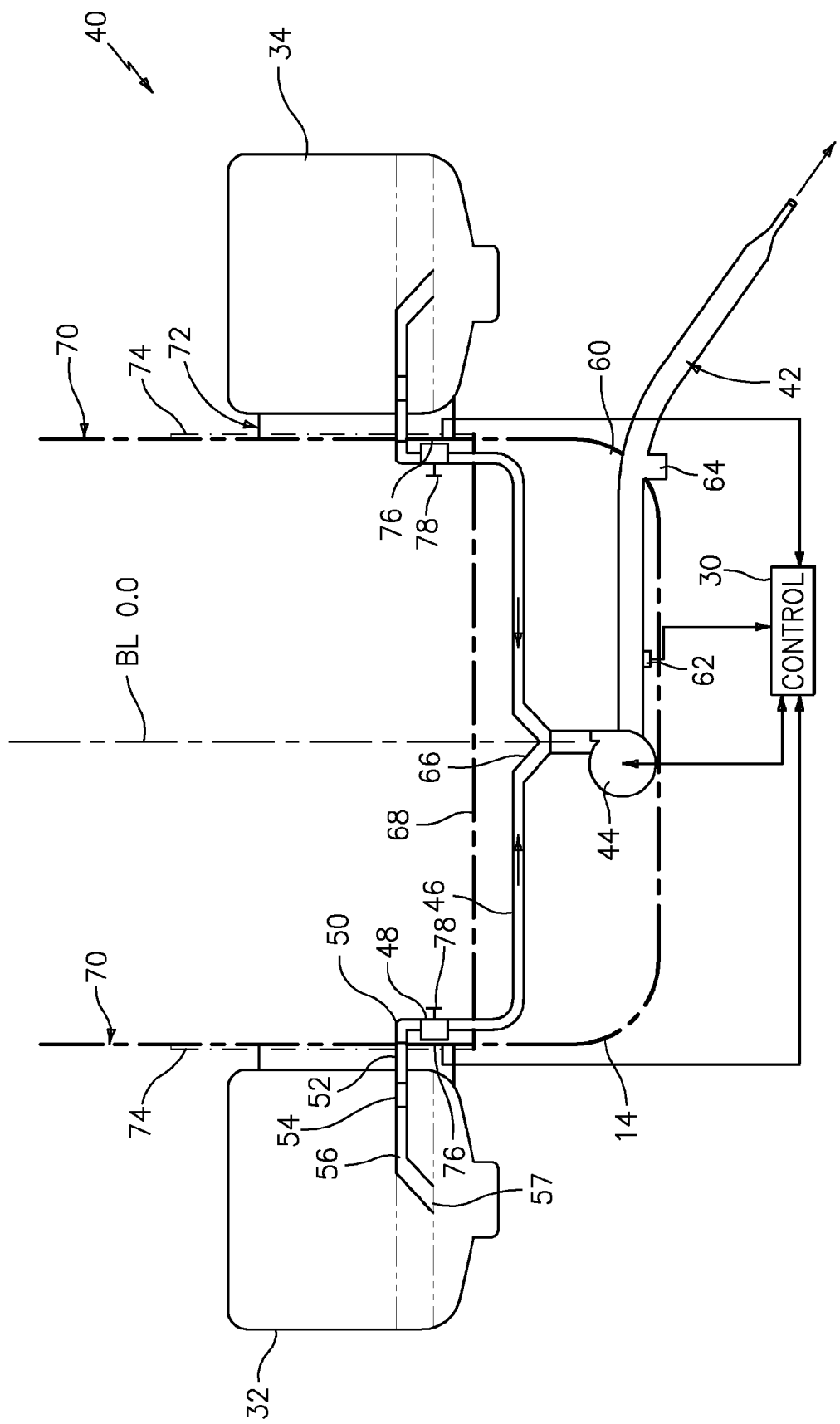
FIG. 3 is schematic block diagram representation of the fuel jettison system according to the present invention.

Referring to FIG. 3, the fuel jettison system 40 generally includes an overboard fuel jettison conduit 42, a fuel pump 44, a fuel jettison conduit 46, a shutoff valve 48, a flex joint 50, a self sealing break away valve 52, a check valve 54 and a dip conduit 56.

Figure 2:
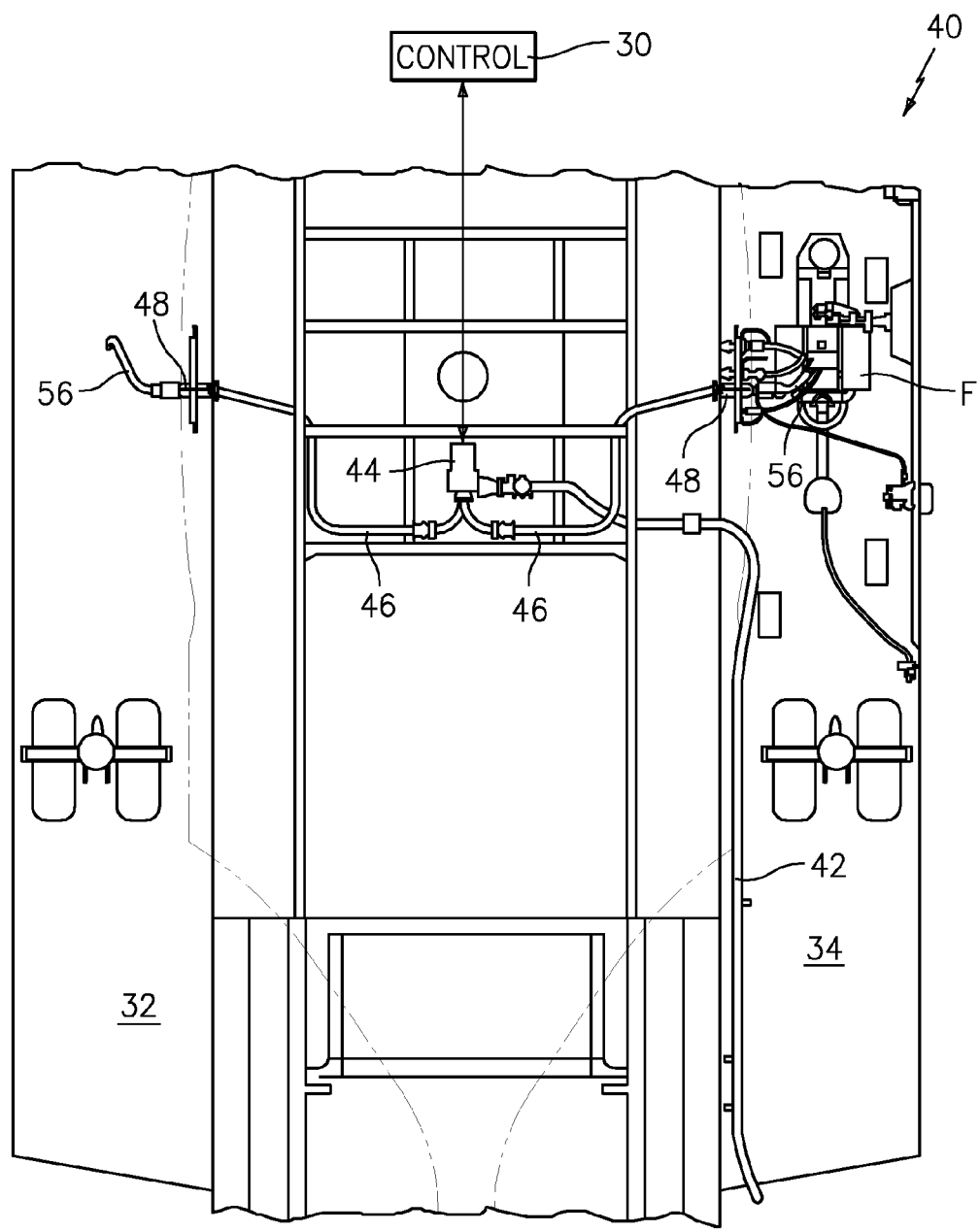
FIG. 2 is a general top phantom view an exemplary rotary wing aircraft illustrating the fuel jettison system of the present invention.

The overboard fuel jettison conduit 42 communicates jettisoned fuel from the fuel pump 44 to an overboard 58 location typically from an aft section of one of the sponsons 36, 38, here illustrated as the starboard sponson 38 (FIG. 2). The overboard fuel jettison conduit 42 penetrates a tub outer mold line 60 (illustrated schematically) of the airframe 14. The overboard fuel jettison conduit 42 includes a pressure sensor 62 which communicates with the fuel management control system 30 for confirmation of fuel pump 44 "on" operation. A condensation drain 64 may also be located within the overboard fuel jettison conduit 42 outboard of the tub outer mold line 60.

The fuel pump 44 is preferably a 600 lb/min minimum pump 3-phase, 400 hz 5-hr run dry capability pump in communication with the fuel management control system 30. The fuel pump 44 is in communication with the overboard fuel jettison conduit 42 and the fuel jettison conduit 46. The fuel jettison conduit 46 communicates with an input to the fuel pump 44 at a fitting 66 such as the illustrated "Y" fitting which provides communication with each main fuel tanks 32, 34 through each of the respective fuel jettison conduits 46. It should be understood that any number of fuel jettison conduits 46—one for each fuel tank—communicate with the fuel pump 44. The fuel pump 44 is preferably located below an aircraft cabin floor 68 generally along an aircraft centerline BL 0.0 such that the fuel jettison path from each main fuel tanks 32, 34 is generally of the same length.

Each fuel jettison conduit 46 communicates between the fuel pump 44 and the respective fuel tank 32. The fuel jettison conduit 46 may pass through the aircraft cabin floor 68 and an aircraft cabin sidewall 70. The flex joint 50 is thereby located intermediate a cabin to sponson interface 72 adjacent the cabin sidewall 70 such that relevant movement of the sponsons 36, 38 relative the airframe 14 is accommodated thereby. The self sealing break away valve 52 is preferably located in the fuel jettison conduit 46 intermediate a frangible plane 74 which forms a portion of the cabin sidewall 70 such that the fuel jettison conduit 46 becomes sealed should the sponsons 36, 38 break away from the airframe 14.

The shutoff valve 48 is preferably positioned within the aircraft cabin sidewall 70 and is in communication with the fuel management control system 30 for selective operation thereby. The shutoff valve 48 is powered open by an actuator 76 such as a solenoid and is closed in response to a mechanical spring bias. Should power be lost, the shutoff valve 48 is biased toward the closed position. That is, the shutoff valve 48 is biased to a closed position and requires power application such as application of 28V DC current controlled by the fuel management control system 30 to open. Notably, electrically powered components need not be located within the fuel tank with the fuel jettison system 40.

A manual actuator 78 such as a lever accessible from within the aircraft cabin may also be operated to manually open the shutoff valve 48. Since the shutoff valves 48 are located in the cabin sidewalls 70, they are accessible to crew should such a need arise.

The shutoff valve 48 also preferably includes an inward venting feature which vents the fuel jettison conduit 46 to operate the fuel pump 44 after the shutoff valve 48 has closed to purge fuel from the fuel jettison conduit 46 at the completion of a fuel jettison event. This assures that all fuel downstream of the shutoff valve 48 is purged from the fuel jettison system 40. The inward venting feature also facilitates ground support fuel pump checkout without having to actually jettison fuel. This may be advantageous in a shipboard environment.

The fuel jettison conduit 46 communicates with the dip conduit 56 located within the fuel tank 32. The dip conduit 56 includes a bellmouth opening 57 thereto at a minimum useable fuel remaining level which is preferably a twenty (20) minute useable fuel remaining level. The fuel jettison conduit 46 penetrates the fuel tank 32 at a relatively low waterline so as to minimize priming times (and total fuel jettison times). Preferably, the dip conduit 56 penetrates into the fuel tank 32 at a level greater than the minimum useable fuel remaining level, for example, a sixty (60) minute useable fuel remaining level. It should be understood, however, that any useable fuel remaining levels may be utilized with the present invention and that the 20 minute and 60 minute time is for example only. The check valve 54 located within the dip conduit 56 assures that fuel will not be inadvertently jettisoned while the fuel pump 44 is in an "off" position.

The fuel management control system 30 typically includes a processing module, such as a microprocessor and a memory device in communication therewith. The fuel management control system 30 stores data and control algorithms in the memory device or other suitable memory location. The control algorithms are the scheme by which the shut off valve 48 operational decisions are made. The fuel management control system 30 preferably utilizes the existing aircraft fuel quantity gauging system (FQGS) 80 (FIG. 1).

In operation, the fuel jettison system 40 provides pilot-initiated automatic operation to jettison fuel down to the sixty (60) minute useable fuel remaining level. The fuel management control system 30 communicates with fuel level probes of the existing FQGS 80 to independently operate the shutoff valve 48 such that aircraft balance is maintained. That is, the fuel jettison system 40 includes control algorithms which will independently operate each shutoff valve 48 such that when each fuel tank 32, 34 reaches the sixty (60) minute useable fuel remaining level, the fuel management control system 30 shuts the shutoff valve 48 then purges that fuel jettison conduit 46. Preferably, the pilot-initiated automatic operation is initiated by actuation of a fuel jettison switch 82 (FIG. 1).

The fuel jettison system 40 requires pilot-initiated manual operation to jettison further fuel down to the minimum twenty (20) minute useable fuel remaining level. Preferably, this operation is achieved by holding the fuel jettison switch 82 throughout the jettisoning operation from the sixty (60) minute useable fuel remaining level to the minimum twenty (20) minute useable fuel remaining level. Since the bellmouth opening 57 of the dip conduit is located at the minimum twenty (20) minute useable fuel remaining level, under no situation will the fuel jettison system 40 jettison a quantity of fuel greater than this minimum twenty (20) minute useable fuel remaining level.

As a fail-safe feature, the fuel pump 44 is commanded closed after a time period such as 11 seconds after the FQGS 80 has detected the total fuel remaining quantity equivalent to 60 minute useable fuel remaining level in automatic operation and equivalent to 20 minute useable fuel remaining level in manual operation. That is, the shutoff valve 48 may be closed but the fuel pump may continue to operate until the time limit elapses.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An aircraft fuel jettison system comprising:
   a fuel tank;
   a fuel pump;
   a fuel conduit in communication with said fuel tank and said fuel pump;
   a shutoff valve having an inward vent within said fuel conduit; and
   an overboard fuel jettison conduit in communication with said fuel pump, said inward vent operable to vent said overboard fuel jettison conduit to permit operation of said fuel pump after said shutoff valve has closed to purge fuel from said overboard fuel jettison conduit at completion of a fuel jettison event.

2. The system as recited in claim 1, wherein said shutoff valve movable between an open position and a closed position, said shutoff valve biased to said closed position.

3. The system as recited in claim 2, further comprising a fuel jettison controller to independently operate said fuel shutoff valve in response to a fuel quantity gauging system.

4. The aircraft as recited in claim 1, further comprising a dip conduit in communication with said fuel conduit, said dip conduit defining an opening at a minimum useable fuel remaining level within said fuel tank, said fuel conduit penetrates into said fuel tank at a penetration level greater than said first useable fuel remaining level.

5. The aircraft as recited in claim 4, further comprising a fuel jettison controller in communication with said fuel pump, said fuel jettison controller providing pilot-initiated one-time activation automatic operation to said penetration level and a continuous activation manual operation to jettison fuel to said minimum useable fuel remaining level less than said penetration level.

6. The system as recited in claim 1, further comprising a dip conduit in communication with said fuel conduit, said dip conduit defining an opening at a minimum useable fuel remaining level within said fuel tank.

7. The system as recited in claim 6, wherein said dip conduit is in communication with said fuel conduit through a self sealing break away valve.

8. The system as recited in claim 6, wherein said minimum useable fuel remaining level within said fuel tank is a twenty minute useable fuel remaining level.

9. The aircraft as recited in claim 8, further comprising a fuel jettison controller in communication with said fuel pump, said fuel jettison controller providing pilot-initiated one-time actuation automatic operation to said penetration level and a continuous activation manual operation to jettison fuel to a minimum fuel remaining level less than said predefined useable fuel remaining level.

10. The system as recited in claim 8, wherein said fuel conduit penetrates into said fuel tank at a penetration level greater than said twenty minute useable fuel remaining level and less than a 120 minute useable fuel remaining level.

11. The system as recited in claim 10, wherein said fuel conduit penetration level is at an approximately 60 minute useable fuel remaining level.

12. An aircraft fuel jettison system comprising:
    a fuel tank;
    a fuel pump;
    a fuel conduit in communication with said fuel tank and said fuel pump, said fuel conduit penetrates into said fuel tank at a penetration level;
    an overboard fuel jettison conduit in communication with said fuel pump;
    a dip conduit in communication with said fuel conduit, said dip conduit defining an opening at a minimum useable fuel remaining level within said fuel tank; and
    a fuel jettison controller in communication with said fuel pump, said fuel jettison controller operable to provide a pilot-initiated one-time activation automatic operation to jettison fuel to said penetration level and a pilot-initiated continuous activation manual operation to jettison fuel to said minimum useable fuel remaining level less than said penetration level.

13. The system as recited in claim 12, wherein said penetration level is an approximately 60 minute useable fuel remaining level.

14. The system as recited in claim 12, wherein said penetration level is a 120 minute useable fuel remaining level.

15. The system as recited in claim 12, wherein said minimum useable fuel remaining level is a twenty minute useable fuel remaining level.

16. The system as recited in claim 12, further comprising a shutoff valve having an inward vent within said fuel conduit, said inward vent operable to vent said overboard fuel jettison conduit to permit operation of said fuel pump after said shutoff valve has closed to purge fuel from said overboard fuel jettison conduit at completion of a fuel jettison event.

17. The system as recited in claim 12, wherein said pilot-initiated one-time activation automatic operation is provide through a one-time actuation of a fuel jettison switch to jettison fuel down to said penetration level.

18. The system as recited in claim 17, wherein said pilot-initiated continuous activation manual operation is provided through continued actuation of said fuel jettison switch to jettison fuel to said minimum useable fuel remaining level.

19. The system as recited in claim 18, wherein said pilot-initiated manual operation stops when said continuous actuation of said fuel jettison switch is interrupted.

* * * * *